ns Patent Office 3,030,954
Patented Apr. 24, 1962

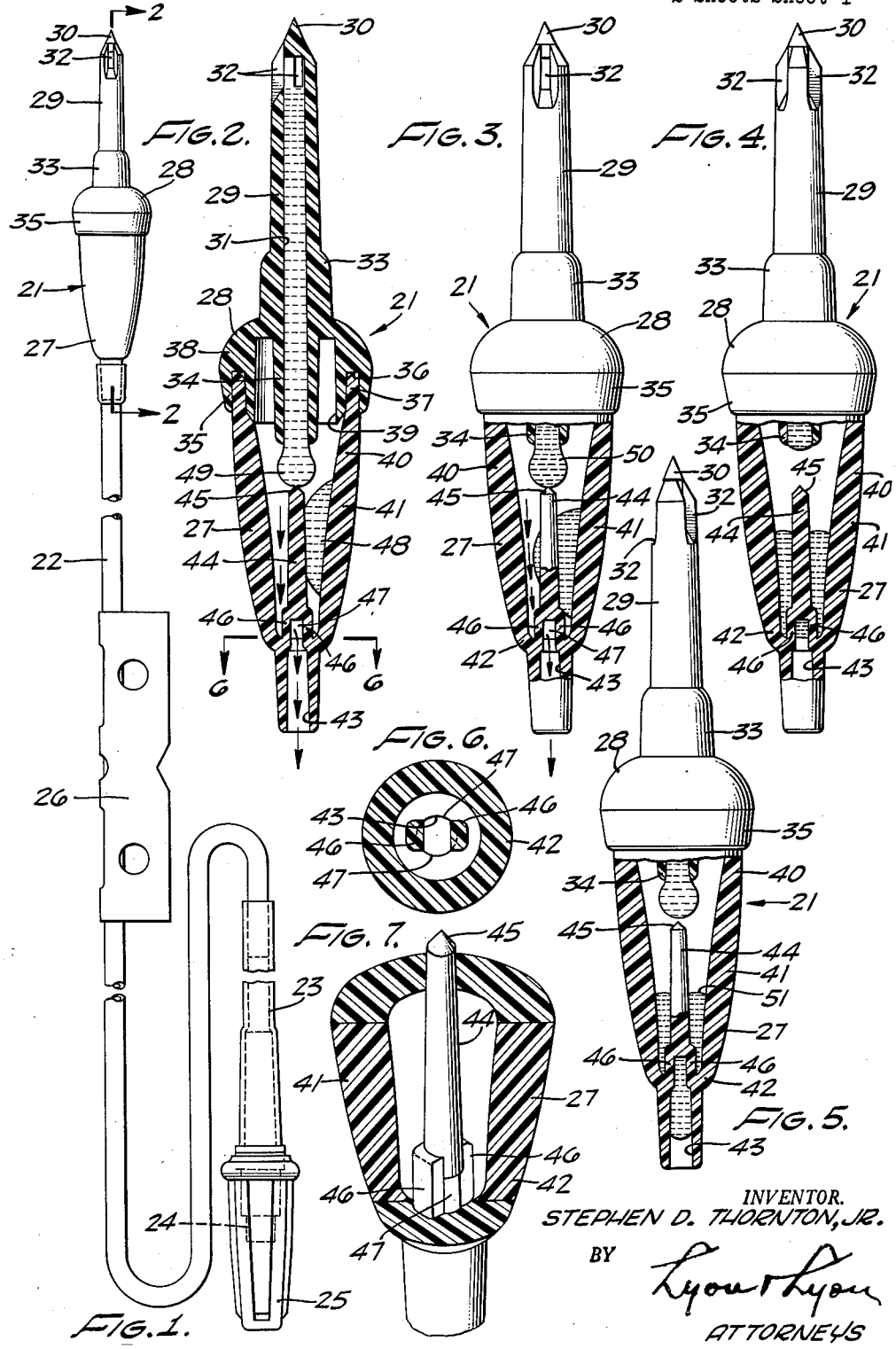

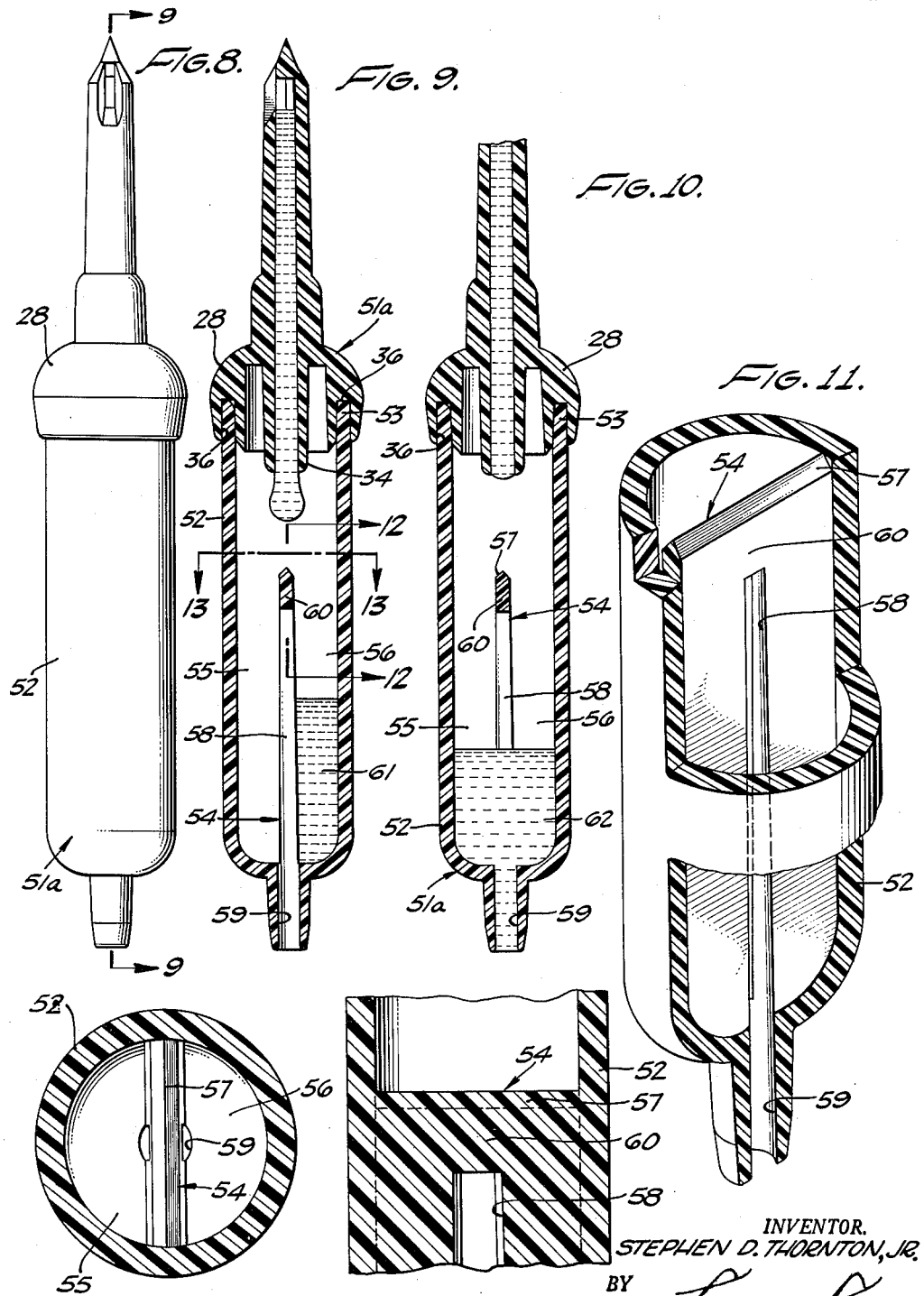

3,030,954
ADMINISTRATION SET
Stephen D. Thornton, Jr., North Hollywood, Calif., assignor to Don Baxter, Inc., Glendale, Calif., a corporation of Nevada
Filed Nov. 12, 1957, Ser. No. 695,833
12 Claims. (Cl. 128—214)

This invention relates to an administration set for parenteral solutions and particularly to a set having a safe, inexpensive drip meter.

Most administration sets for parenteral solutions are expendable; that is, they are discarded after a single use. For this type of a set it is important to keep the cost as low as possible. Much of the cost of an administration set lies in the drip meter. Reducing the size of the drip meter has not been successful because of the danger of entraining air in the administration tube and because a small drip meter is difficult for a busy anesthetist to see.

It is the general object of this invention to provide a safe, inexpensive drip meter.

Another object of this invention is to provide a small drip meter in which the flow may be easily seen.

Another object of the invention is to provide a small drip meter which will not cause air to be entrained in the administration tube.

Another object of the invention is to provide a drip meter which will fill automatically without manipulation.

Administration sets of the present invention will be more fully understood from the description of the preferred form of the invention given with the accompanying drawings, in which:

FIGURE 1 is a side elevation of the invention.

FIGURE 2 is a sectional view on the line 2—2 of FIGURE 1.

FIGURES 3, 4, and 5 are partial sections showing the invention in various stages of its operation.

FIGURE 6 is a sectional view on the line 6—6 of FIGURE 2.

FIGURE 7 is a perspective view, partially in section, of the lower portion of the drip meter body.

FIGURE 8 is a side elevation of a modified form of the invention.

FIGURE 9 is a sectional view on the line 9—9 of FIGURE 8.

FIGURE 10 is a sectional view showing the invention during operation.

FIGURE 11 is a perspective view, partially in section, of the modified form of the invention.

FIGURE 12 is a sectional view on the line 12—12 of FIGURE 9.

FIGURE 13 is a sectional view on the line 13—13 of FIGURE 9.

Referring now to the drawings, the administration set has a drip meter generally indicated as 21, an administration tube 22, a rubber gland 23, a needle adapter 24, and a protector 25. Flow through the administration tube 22 is controlled by the clamp 26.

The drip meter 21 has a body 27 and a cap 28. A shaft 29 extends outwardly from the cap 28 and has a piercing point 30 on the exterior end. A passage 31 extends through the cap 28 and shaft 29 terminating in the openings 32, near the point 30. The base of the shaft 29 has a hub 33 which is adapted to receive a protector or breather (not shown) to maintain the inside of the set in a sterile condition. The hub 33 also limits insertion of the shaft 29 into a container so that the cap 28 is held away from the container. A drip tube 34 extends inwardly from the cap 28 and extends the passage 31 into the body 27. The cap 28 has a skirt 35, and an annular slot 36 which is adapted to receive the top 37 of the body 27. The curved section 38 of the top may be solid, or it may be provided with an annular recess 39 to facilitate uniform cooling of a molded part.

The body 27 has a cylindrical top 37, adapted to fit in the annular slot 36 of the cap 28. Below the top 37, the body 27 tapers toward a smaller diameter. The top 40 of the tapered section has a relatively thin wall. The middle or lens section 41 of the tapered section has a thick wall. The bottom 42 of the tapered section has a thin wall. The tapered body facilitates molding of the part and helps provide a drop-delay mechanism, as later described. Below the bottom section 42, an outlet tube 43 leads fluid through the administration tube 22 to the needle adapter 24. A rod 44, having a pointed tip 45, extends axially up from the outlet tube 43. The rod 44 is supported by the feet 46. Openings 47 connect the body 27 with the outlet passage 43.

As indicated in the above description, the walls of the body 27 are thicker in the middle 41, than at the top 40 and bottom 42. This construction forms a longitudinal lens wrapped around the body 27 so that lengthwise magnification takes place. At the top 40 the distance between the drip tube 34 and the body wall must be sufficient to prevent bridging of a liquid drop. At the middle 41, the body 27 has a smaller diameter so that a liquid drop bridges between the wall and the rod 44. The rod 44 is tapered and the feet 46 are large to facilitate removal of the part from the mold. The openings 47 allow a smooth, downward flow of fluid into the outlet passage 43 so that the drip meter is purged of air as solution enters the body 27.

In use, flow through the outlet tube 43 is shut off by a clamp 26 on the administration tube 22. The piercing point 30 and shaft 29 are inserted into the outlet of a parenteral solution container. The hub 33 meets the outermost surface of the container and prevents the cap 28 from contacting the container. The container is then suspended for administration of the solution. The clamp 26 is opened slowly and fluid passes through the passage 31 to the drip tube 34. As shown in FIGURES 2–5, the first drop 48 contacts the tip 45 and flows down the rod 44 until it contacts the wall of the middle section 41. In like manner, the second drop 49 joins the first drop 48. As each drop enters the drip meter, an equivalent volume of air is expelled through the openings 47 to the outlet tube 43. When the third or fourth drop 50 joins the first drops, the combined weight of the drops is usually sufficient to force them to the bottom 42 of the body, covering the openings 47, as shown in FIGURE 4. As additional drops fall into the body 27, liquid passes through the outlet tube 43 filling the administration tube 22.

The drop rate is easily determined through the magnifying body 27 by watching the drops forming on the drip tube 34, or the falling and rising of the meniscus 51. Thus, a drip meter having a length of only 1 to 1½ inches, from the bottom 42 to the top of the cap 28 may be used. Thus the length of the body may be less than four times its maximum diameter.

The distance from the drip tube 34 to the tip 45 of the rod depends on the size of the drops and therefore on the size and design of the drip tube 34. This distance should be large enough to allow the drop to form completely, but small enough to stop the fall of the drop before it builds up much kinetic energy. Preferably the drop will touch the tip 45 and slide onto the rod 44 without any free fall. If the drop does fall, the energy of the drop tends to force the liquid into the bottom 42 of the body prematurely. Thus, the openings 47 are covered when there is not enough liquid in the body 27. As an example, if the end of the drip tube 34 has an effective diameter of 0.08 inch, the distance from the end of the drip tube 34 to the tip 45 should be about 0.17 inch to prevent free fall of the drop. If this distance is increased to 0.23 inch, the drop falls from the drip tube 34 to the tip 45, and the openings 47 are covered with liquid when only two, or possibly 3, drops are in the body 27.

The material from which the body 27 is constructed should be transparent and easy to mold. The inside surface of the material must be wettable to some extent so that the drop is held in place between the rod 44 and the wall 41. A very non-wettable surface, such as certain silicone-coated surfaces, allows the individual drop to run to the bottom of the chamber covering the openings 47. On the other hand, the surface must not be so wettable that the drops form a thin surface layer which immediately runs to the bottom of the drip chamber. It appears then that the surface must be somewhat wettable, but the force of adhesion between the liquid and the surface, must be less than the force of cohesion holding the drops together. Methyl methacrylate, polyvinyl chloride, polystyrene, nylon, glass or other transparent moldable material are suitable materials from which the drip meter 21 may be made. Of course, the body 27 and cap 28 may be of different materials.

The top 28 may be made of any plastic material which is easy to mold and to attach to the body 27. Preferably, the top is also transparent so that light, passing through the bottom of the solution container, is piped by the shaft 29 to the drip tube 34 and to any fluid on the drip tube. This "light-piping" effect lights the drop, increasing its visibility.

In the modification of the invention shown in FIGURES 8–13, the drip meter 51a has a cylindrical body 52. The top 53 of the body fits into the annular slot 36 of the cap 28. A partition 54 extends upwardly from the bottom of the body 52, dividing the interior of the body into the sections 55 and 56. The partition 54 has a V-shaped top 57 and a generally cylindrical, slightly tapered slot 58. The slot 58 opens into the section 55 on one side and the section 56 on the other side. The lower end of the slot 58 opens into the outlet passage 59. The upper end of the slot 58 is closed by the top portion 60 of the partition 54.

In use, the first drop of liquid falling from the drip tube 34 contacts the V-shaped top 57 of the partition 54 and passes into the section 55 or 56. Subsequent drops follow the path of the first drop apparently because the side of the partition 54 is wet by the liquid. Thus, the liquid 61 builds up in one section, for example section 56, while air displaced by the liquid entering the body 52, escapes from the section 55 through the outlet passage 59. Eventually, the height of the liquid column 61 forces the liquid into the slot 58 and the outlet passage 59. When this occurs, some of the liquid in the section 56 passes into the section 55 so that the liquid 62 has about the same level in each section. Further drops of liquid from the drip tube 34 displace liquid, not air, from the body 52, filling the administration tube 22. If drops bridge between the wall of the body 52 and the partition 54 trapping air, the air escapes through the upper portion of the slot 58 into the other section.

I claim:

1. A drip meter comprising: a body having an outlet; a top on said body; an inlet passageway through said top; a drip tube formed by the extension of said passageway into the body; and a projection extending from the body to a point immediately below the drip tube, the distance between said projection and the drip tube being sufficiently large to permit formation of a drop on the end of the drip tube, but sufficiently small to contact said drop before the drop falls from the drip tube.

2. A drip meter as set forth in claim 1 wherein the body has a bottom and the projection is a solid rod extending upward from the bottom of the body, said rod having walls which, at the base of the rod, form openings communicating with the outlet.

3. A drip meter as set forth in claim 1 wherein the body is provided with a means for longitudinally magnifying movement within said body.

4. In an administration set, a drip meter comprising: a body; means forming an outlet from said body; two walls within said body forming a restricted passageway communicating with said outlet, said walls being close enough together to temporarily prevent the first drops of fluid from flowing through said passageway and far enough apart so that said first drops of fluid will be forced through the passageway by hydrostatic pressure when the body contains sufficient fluid for normal operation; a drip tube associated with the body; and a projection extending from the body to a point below the drip tube, the distance between said projection and said drip tube being sufficiently large to permit formation of a drop on the end of the drip tube, but sufficiently small to contact said drop before the drop falls from the drip tube.

5. In an administration set, a drip meter as set forth in claim 4 wherein the body has a wall having top, center and bottom portions and the wall of the body is relatively thick in the center portion and progressively decreases in thickness towards the top and bottom sections, thus forming a longitudinal lens.

6. In an administration set, a drip meter comprising: a body having an outlet; a wall on said body having a top and a bottom, and a center section between said top and bottom; a cap on said body; an inlet passageway extending through said cap; a drip tube formed by an extension of said passageway into the body; the wall of the body having a curved outer surface and being relatively thick at the center section and progressively decreasing in thickness towards the top and bottom.

7. In an administration set, a drip meter comprising: a body having a top and a bottom, and a side wall; an outlet means at the bottom and a cap on the top of said body; a shaft projecting outwardly from, and a drip tube projecting inwardly from said cap; a fluid passageway through said shaft and drip tube; a solid elongated projection extending upwardly from the outlet means towards the drip tube; the wall of the body being progressively thickened toward the center portion to form a longitudinal lens; the distance between the projection and the body wall being relatively small so that a single drop moving down said projection contacts both the projection and the body wall.

8. A miniature drip meter comprising: a body having a fluid inlet, an outlet and a drip tube; means on the body for longitudinally magnifying movement within the body; means within the body for preventing the first drops of fluid from said inlet from reaching the outlet until sufficient fluid is in the body to adequately fill it; and means within the body for preventing the entrainment of air bubbles by drops of fluid from the drip tube.

9. In an administration set, a drip meter comprising: a body having an upper and a lower portion, said upper portion having a top and said lower portion having a bottom; means forming a fluid inlet at the top of said body; a drip tube associated with said inlet; means forming a fluid outlet at the bottom of said body; a partition dividing the lower portion of said body into substantially equal halves; means forming a slot in the center of said partition, said slot opening into both of said halves and communicating with said outlet; and a portion of said partition extending across the top of said slot.

10. In an administration set, a drip meter comprising: a body having a fluid outlet and a fluid inlet; a drip tube associated with said inlet; a partition dividing the body into sections; means on the partition for directing fluid into one of said sections; and means forming a restricted passageway at the bottom of said partition, through which the fluid flows to cover the outlet only after the body contains sufficient fluid.

11. A drip meter comprising: a body having a wall, a top and a bottom; an inlet passage through said top; a drip tube formed by an extension of said passage into the body; an open chamber defined by the wall of the body and subjacent to the drip tube; a projection extending upwardly from the bottom of the body toward the drip tube; an annular passageway defined by the projection and the body wall and subjacent to the open chamber, the walls of said passageway tapering downwardly toward each other to provide a restricted lower passageway portion sufficiently narrow to temporarily prevent the first drops of liquid entering the drip meter from passing through said passageway; a liquid outlet near the bottom of the body; and an outlet opening below the restricted passageway portion connecting said portion to the liquid outlet.

12. A drip meter comprising: a body having a top, a bottom, and an inwardly-facing, circumferential surface; an inlet passage through said top and an outlet passage through said bottom; a drip tube formed by an extension of the inlet passage into the body; a projection extending upwardly from the bottom of the body into said body and having an outwardly-facing, circumferential surface; a passageway defined by the outwardly-facing projection surface and the inwardly facing body surface, said passageway having generally annular cross-sections which progressively decrease in area toward the bottom of the body, the portion of said passageway adjacent the bottom of the body being sufficiently narrow to temporarily prevent the first drops of liquid entering the drip meter from passing through said passageway; and an outlet opening connecting said passageway to the outlet passage.

References Cited in the file of this patent
UNITED STATES PATENTS

| | | |
|---|---|---|
| 2,090,273 | Wagner | Aug. 17, 1937 |
| 2,586,581 | Tschischeck | Feb. 19, 1952 |
| 2,644,586 | Cutter | July 7, 1953 |
| 2,664,085 | Ryan | Dec. 29, 1953 |
| 2,675,000 | Ford | Apr. 13, 1954 |
| 2,693,801 | Foreman | Nov. 9, 1954 |
| 2,779,232 | Small | Jan. 29, 1957 |
| 2,786,467 | Price | Mar. 26, 1957 |
| 2,844,147 | Beacham | July 22, 1958 |

FOREIGN PATENTS

| | | |
|---|---|---|
| 85,077 | Norway | Feb. 28, 1955 |
| 157,211 | Sweden | Dec. 11, 1956 |